Sept. 25, 1951     H. B. REED     2,569,134
ROOFING MATERIAL

Filed Oct. 8, 1946     2 Sheets-Sheet 1

INVENTOR
HAROLD B. REED
BY
*George P. Ericson*
ATTORNEY

Sept. 25, 1951      H. B. REED      2,569,134
ROOFING MATERIAL
Filed Oct. 8, 1946      2 Sheets-Sheet 2

INVENTOR
HAROLD B. REED
By George R. Cowan
Attorney

Patented Sept. 25, 1951

2,569,134

UNITED STATES PATENT OFFICE 2,569,134

ROOFING MATERIAL

Harold B. Reed, Hammond, Ind., assignor to H. B. Reed and Company, Hammond, Ind., a partnership of Indiana Application October 8, 1946, Serial No. 702,043

3 Claims. (Cl. 117—32)

This invention relates to a new and improved roofing granule and to the method of manufacturing the same and applying them to asphalt roofing, shingles, and other articles requiring a protective coating. One feature of the invention is particularly important in the manufacture of tapered shingles which are usually produced by longitudinally splitting a strip of roofing material which is thickened in the middle along a line which represents the butts of the shingles. It has been recognized that granular materials for roofing should embody several characteristics; for instance, it is necessary that the granules have sufficient weight so as to retain the roofing in a flat position against wind pressures to which they may be subjected. It is also necessary that the granules be fireproof. That is to say, that the material should be of such a character as to be non-fusible under a temperature approximating 2000° F. It has also been recognized that the life of the granules should be as long as possible, that they should be able to withstand rough treatment, and be capable of interlocking association with the binder to hold them permanently in position.

In the prior art, it is customary to provide in the better grade of granular roofs a ceramic granular material, the base of which is usually quartz, traprock, or some other mine mineral, which will permit a coating of a silicious material containing pigments of different color to provide green, blue, buff, red, white or black, in all shades. In the formation of granular material of the ceramic type, the base is crushed and screened to proper size and then coated and cooked in a rotary kiln at about 1400°. Ceramic granules prepared by such a method gradually fade and usually the shading is irregular, which results in a mottled appearing roof. To avoid this mottled roof appearance, various blends of several colors have been used in the industry. However, this method has not proven entirely satisfactory. It is further true in the use of ceramic granules for roofing that light reflection is not uniform in all directions, and therefore in the laying of a roof, it is necessary to use right and left shingles, this requiring the turning of the shingles alternately end to end to provide a uniform light reflection on the roof. To prevent confusion in this connection, the manufacturer of ceramic granular shingles separates the rights and the lefts and ships only right shingles or left shingles to the same customer, and this shipping of the same type of shingle having the same direction of reflection must be continuous; otherwise, the customer may eventually mix the right and left shingles and thus obtain a variegated reflection. In the use of ceramic granules, it is also found that the tendency in crushing the mineral results in a flat granule body, and such granules are not capable of interfitting engagement with each other, which interfitting is necessary to eliminate moisture and to protect the asphalt of the shingle. In other granular roofing where gravel, sand, ground brick, shale, and similar material is used, it is found that such materials are not impervious to moisture, but being more or less porous, absorb moisture, permitting the moisture to get down to the asphalt of the shingle and shortening the life of the shingle, due to explosion in winter and general disintegration in heat, and at extreme heat the generation of steam will cause the rupture of the granules from the shingle when of a porous nature.

One of the disadvantages of previously known roofing materials has been the comparatively flat shape of the granule. The application of the granules is accomplished by first coating the fibrous base of the roofing material with tar or asphalt, then sprinkling a layer of granules on the coating, and finally passing a continuous sheet of the coated and sprinkled fabric between rolls. Whenever the thickness of the granule is less than its width, it may first strike the asphalt edgewise and then be tilted over during the rolling process so as to leave its opposite edge resting on the next particle. This occurs with sufficient frequency to give the roofing a combed appearance and results in its appearing darker from one side than from the other. This optical illusion would be comparatively unimportant, if the shingles could all be cut in the same direction, but this is not practical in the manufacture of tapered shingles, and it has been considered necessary to mark the "rights" and "lefts," and keep them separate, so that both types will not be used on the same building.

Another disadvantage of previously known roofing granules has been the tendency to deteriorate when exposed to the weather. This is chiefly due to the presence of minute cracks and fissures in the granules which become filled with moisture which freezes and splits off portions of the granules. My improved granule is comparatively free from cracks and fissures and has a polished, non-porous surface incapable of being penetrated by moisture.

Another disadvantage of previously known roofing granules is that they are of such irregular shape as not to cover a sufficient percentage of the asphalt, thus leaving the asphalt exposed to the weather. My improved granule is formed in a roughly cubical shape, and the surfaces are capable of interfitting much more closely than those of previously known granules. To more specifically describe the present form of granules it might be stated that each granule comprises a multihedral structure in which the various surfaces are substantially uniform in area. The purpose of this type of granule will be obvious in that it provides a uniform area of contact with the roof and with the abutting or adjoining granules and eliminates a possibility of a condition which would exist should the granules be of other or irregular shapes, including thin flat slivers which are so conventional and which result in the formation of pockets and prevent uniform adhesion. Since the granule itself is impervious to the asphalt, the asphalt is sealed in much more effectively than was the case with previous granules.

To accomplish the foregoing, the roofing granules of the present application are provided from a material and through a process which will create an individual granular element that will not fracture flat but will fracture in cubical form, will be opaque to prevent the penetration of light and yet sufficiently brilliant of surface to provide essential light reflective portions for deflecting both heat and light rays.

Further, the granules to be hereinafter described, fracturing in cubical form, of necessity, provide interfitting bodies which, when applied to a surface, entirely eliminate the possibility of a porous structure, thus preventing seeping of moisture and constant deterioration in summer due to vaporization of the solvent contained in the roofing material and further eliminate the possibility of explosion of the roof surface in winter due to the freezing of moisture which might otherwise penetrate and subsequently freeze.

I have found that granules having the characteristics above outlined can be provided by the treatment of molten ash from wet bottomed powdered coal furnaces, at certain temperatures, and in an improved manner as hereinafter described.

One object of this invention is to provide for the use of molten ash from wet bottomed powdered coal furnaces for the purpose of providing granules having the characteristics heretofore mentioned without interfering with the normal operation of the furnace producing the slag.

Another object of the present invention is to form a roofing shingle having a granular surface so formed and arranged that the possibility of an optical illusion is eliminated, thus avoiding expense in handling and laying of shingles.

Another object of the present invention is to provide automatic means for use in connection with wet bottomed powdered coal furnaces for providing ash granules of the type described.

Another object of the present invention is to provide an improved method of eliminating cracks and crevices in the quenched ash granules.

Another object of the present invention is to so control the formation of the granules as to prevent the formation of the cylindrical sections of length greater than their diameter, which are normally present in powdered coal furnace ash and which are likely to puncture the roofing, or injure the hands of workmen.

Another object of this invention is to provide a granular roofing of such a character that the solvents of the asphalt binder are retained against evaporation due to heat, whereby the adhesive nature of the roofing is protected and the life of the roofing substantially increased.

Other objects will more clearly hereinafter appear by reference to the accompanying drawings and claims.

Figure 1:
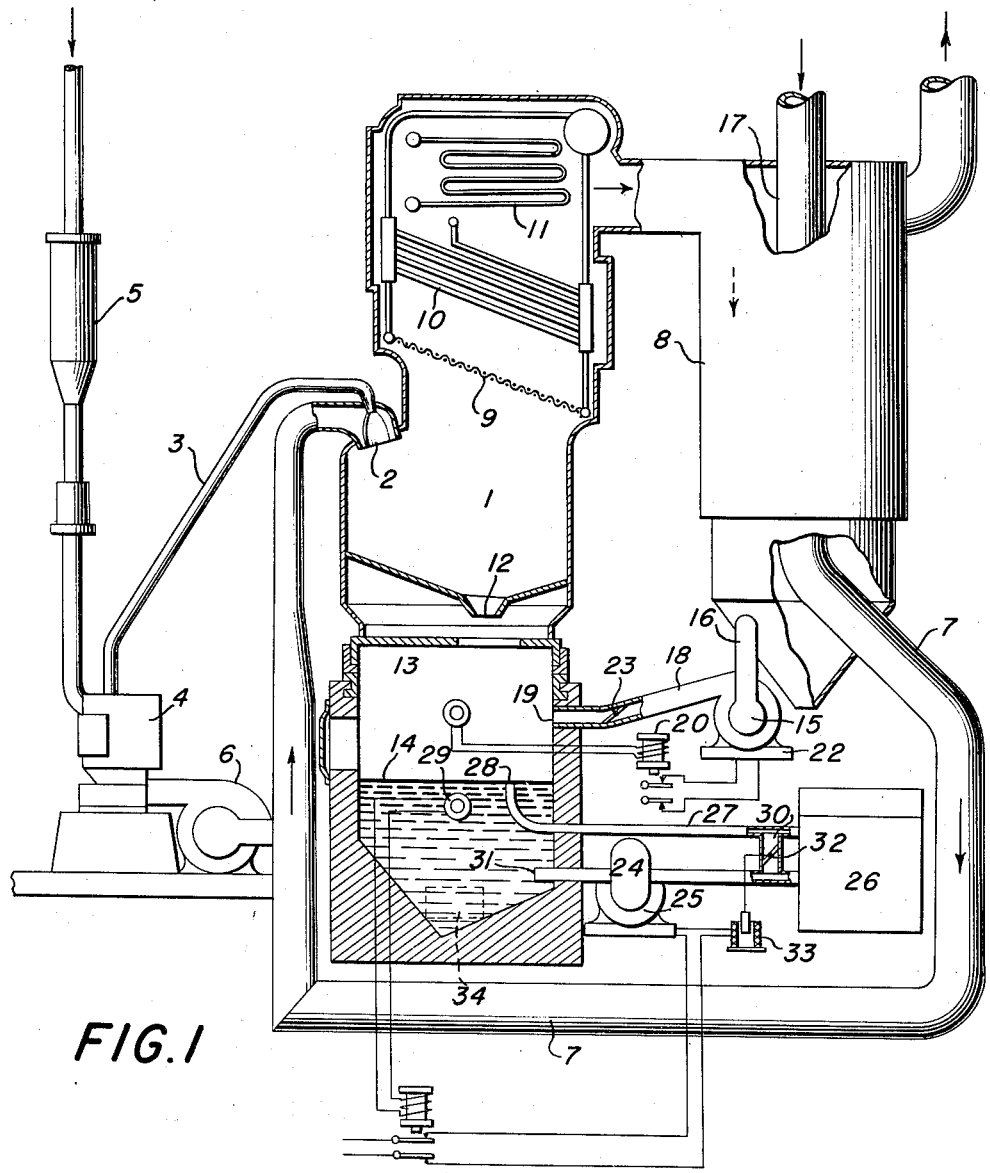
Figure 1 is a diagrammatic disclosure of an apparatus for producing the granular material.

In considering this invention, it is important to note that the term "slag" has been very loosely used in the various arts and has sometimes been used to describe any waste matter from a furnace. For instance, there is slag from blast furnaces, slag from coal furnaces, and slag from any other type of furnace in which there is a burning of a mass. Slag, in general, is not suitable for the production of granules for roofing. For instance, molten, blast-furnace slag explodes on contact with water, and produces a spongy and frangible material totally unsuitable for the purpose. Slags from ordinary coal furnaces are also frangible and porous. Still other slags have these and additional unsatisfactory characteristics, such as fracturing flat, not sufficiently opaque, not having suitable reflective surfaces for the deflection of heat and light, and not being capable of intimate interfitted association for waterproofing.

In carrying out the present invention, applicant has learned after extensive research that the molten ash or "slag" from wet bottomed powdered coal furnaces, when properly treated at certain temperatures and when properly fractured, provides a granular material answering all of the requirements of the trade and all of the requirements heretofore noted as essential in the manfacture of granular roofing. The slag from the molten ash of wet bottomed powdered coal furnaces when analyzed approximates substantially the following chemical analysis:

|  | Per cent |
|---|---|
| Total carbon | .06 |
| Titanium oxide | .95 |
| Iron as FeO | 23.05 |
| Iron as $Fe_2O_3$ | 4.45 |
| Phosphorus | .11 |
| Silica | 42.66 |
| Manganese | .04 |
| Aluminum oxide | 20.97 |
| Calcium oxide | 6.41 |
| Magnesium oxide | 1.11 |
| Sulfate S as $SO_3$ | .15 |
| Moisture—105 C | .04 |
|  | 100.00 |

The slag from wet bottomed powdered coal furnaces as used in the present process for producing the granular material in question is in fact a molten ash, being substantially free of impurities such as found in conventional slag, and being purely the by-product from the burning of powdered coal in a certain type furnace.

The discharge of the slag from the wet bottomed powdered coal furnace is in a fluid state, and this discharge from the furnace must be maintained at a predetermined constant temperature so that there is substantially no variation in its fluid state from its discharge from the furnace to its entry into the quenching pit, which may be any suitable fluid material, but preferably water.

The molten ash must be quenched before it falls too far, and any tendency to cool before entering the quenching water creates a tendency of the ash to string out, these strings being in the form of splines or strings, inherently incapable of a proper shattering and intermingling with portions of the slag which may properly shatter so that the entire discharge from the furnace is wasted. To maintain the fluid ash at a suitable and uniform temperature from the furnace to the quenching water, a heating means including automatic controlling mechanism is hereinafter described and forms a part of my invention.

The type of furnace used in producing the roofing granules of the application usually ranges in temperature in the fire box during operation from 2850° F. to 3050° F., this temperature being approximated at the active burning level, as measured with an optical pyrometer. The temperature of the molten slag as it leaves the furnace ranges between 2300° F. to 2500° F., and this range can be controlled by changing burner secondary damper positions and/or altering the operated $CO_2$ setting.

A furnace capable of carrying out the method or process of producing the granule from the molten ash provides a drop approximating 4 feet 4 inches from the lip of the discharge port of the furnace to the surface of the quenching water. This distance should not be increased and is preferably reduced. It is intended that the area through which the molten ash is discharged shall be maintained constantly at a predetermined temperature by discharging into this area superheating means, as, for instance, by utilizing a by-pass from the economizer to a point of discharge immediately above the quenching water. It is also noted that a reduction of the height of fall should be accompanied by some increase in the temperature of the molten ash at the time it strikes the water. It is intended and illustrated in the drawings of this application that the discharge from the economizer may be regulated by an automatic damper mechanism including a thermal control element.

It has been determined that different coals produce fluid ash with different melting points and therefore the regulation of the temperature through which the fluid ash travels must be subject to a predetermined setting, which setting obviously should represent that temperature producing the most desirable results in connection with the coal utilized in the furnace. The flow of the fluid ash will of course be at all times subject to inspection so that the desired adjustments of the temperature range may be made. It is obvious that the heat from the furnace proper rather than from the economizer might be used, and from whatever source the heat is derived, it can be discharged in the area of the flowing fluid ash in regulated quantities by either forced or natural draft.

The distance between the discharge point of the fluid ash in the furnace to the quenching water is of importance in that the size of the stream is decreased with the length of fall and also with increase in temperature. When the stream is too small or too cool, there is a tendency to form splines or icicles, and the fragmentation is insufficient. For these reasons, the path of travel of the fluid ash must be maintained at relatively high temperatures, and these temperatures must be kept constant. It is also essential that the quenching fluid be of such volume and depth as to produce the proper freezing of the fluid ash. This freezing must be substantially instantaneous to produce good fragmentation and tempering of the particles. Also, when fluid ash of the type in question is allowed to cool too slowly, it becomes more or less porous and extremely dull in color. An ash which cools slowly therefore is not suitable as a roofing material, due to its porosity and its lack of color. Thus, the discharging molten ash is kept at a high temperature from the point of discharge in the furnace to the quenching water to prevent pre-cooling.

It will be apparent to one skilled in the art that the granular material, due to its cubical form, provides a structure capable of maximum cooperation with the binder and completely covers the roofing surface to protect the latter against changes in temperature and moisture, while at the same time provides light reflection in all directions, thus presenting a uniform surface color eliminating the necessity of pre-selection of shingle direction.

When the fluid ash from wet bottomed powdered coal furnaces maintained at a proper temperature to the quenching water, it becomes a tempered glass, very dark in color and very hard in substance. The strains set up during the cooling are such that it fractures into roughly cubical pieces, most of which are smaller than a half inch in diameter. The particles in this state contain many incipient fractures, but are easily broken down into very hard tempered particles. This material when so chilled is known as chilled ash, and this ash after being properly dried in a rotary kiln is crushed by suspended attrition by means of an apparatus hereinafter described. Suitable separation and screening of the chilled ash when it leaves the attrition mill is preferably provided.

The granules of my invention can be produced in various types of furnaces, but a very satisfactory source is the molten ash as it is strained from the powdered coil boiler furnace illustrated by the drawings of this application.

Figure 1 is a diagram of a furnace of this type modified in accordance with my invention. The reference numeral 1 indicates the combustion chamber which receives powdered coal through the inlet 2 which is supplied with coal in the form of dust carried by an air blast through the conduit 3 leading from the coal mill 4. A section of the coal source is indicated at 5, and the air blast is provided by a blower indicated at 6 which receives its air from the hot air inlet 7. This fresh air is passed through the economizer 8 and is preheated to a high degree.

At the top of the combustion chamber is a slag screen 9 above which the steam and superheater coils 10 and 11 are located. The inclined bottom of the furnace is provided with a drain hole 12 through which the molten ash drains into a pit 13 which is filled with water to the level indicated at 14. The distance between the opening 12 and the water level 14 is important as previously indicated, and this is 4 feet four inches in one type of furnace which has been found to successfully produce the material.

The temperature in the chamber 13 between the hole 12 and water level is of considerable importance. In order to maintain this temperature at the proper level, I have provided a blower 15 which receives heated air from the economizer through an inlet 16. This air may be the furnace gas, as it is very highly heated, although in some installations it will be more satisfactory to take fresh air from the conduit 7 after it has passed the preheating section 17. The blower is provided with an outlet conduit 18 leading into the pit 13 as indicated at 19, and the operation of the blower is controlled through a relay 20 from the thermostat 21. This thermostat may be of any suitable type, and the relay may be arranged to either cut off the motor entirely or operate it at reduced speed when the temperature in the chamber 13 is sufficiently high. In addition to controlling the speed of the motor 22 which operates the blower, a manual or thermo-control may be connected to the damper 23 in the conduit 18.

The temperature of the cooling water in the chamber 13 is also of importance. For that reason I have provided a circulating supply pump 24 driven by motor 25 to supply water to the pit after circulating it through the cooling tank 26. In order to maintain a proper level of water, an overflow and return pipe 27 is connected to the tank 26 and provided with an inlet 28 at the desired level.

The operation of the motor 25 is controlled by a thermostat 29 mounted in the pit 13 below the water level. In order to prevent overcooling of the water and thereby control its temperature, I have provided a by-pass 30 between the water return pipe 27 and the water inlet pipe 31. This by-pass is controlled by a valve 32 which is operated by solenoid 33, either in conjunction with the motor 25 or separately, as desired.

In the operation of the device shown in Figure 1, the molten ash drains down from the opening 12 and falls into the water where it is quenched and instantly solidified, accompanied by fragmentation of the particles as previously described. The particles collect in the bottom of the pin 13 and are removed through the opening 34 by means of a conveyor extending through a water seal to the atmosphere at a point above the water level, or by any other suitable means.

Figures 2, 3:
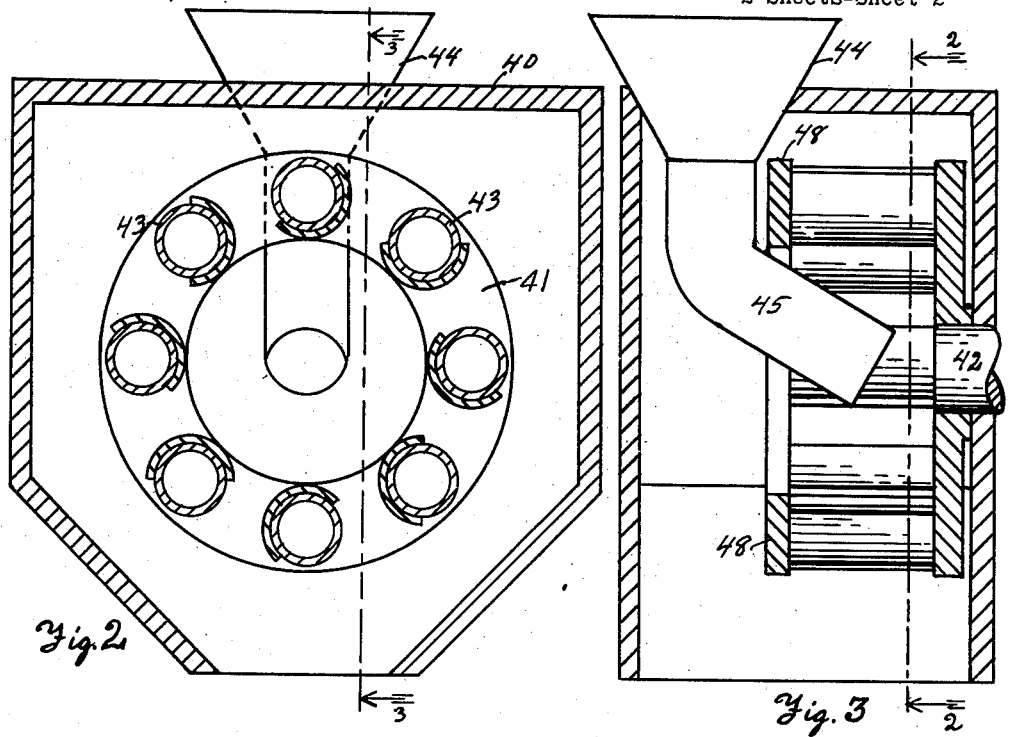
Figure 2 is a diagram of the suspended attrition machine by which it is reduced.
Figure 3 is a side elevation of the device shown in Figure 2.

When the particles have been removed from the furnace pit, and dried, they contain many internal strains and have cracks and fissures which render them frangible and easily damaged by the weather. I find that they cannot be satisfactorily reduced by the mere crushing, as this results in the formation of ordinary crushed or broken glass particles, with so many cutting edges as to render them dangerous to handle and unsatisfactory in use. I prefer to complete the process of reduction by breaking up the mass into individual particles rather than by crushing the individual particles themselves. I find that this can be most satisfactorily accomplished by a suspended attrition process. An apparatus suitable for that purpose is shown in Figures 2 and 3.

The suspended attrition machine comprises a casing 40 formed of very heavy plate metal and containing a rotor 41 which is carried by the shaft 42 and driven by any suitable means at a speed of approximately 1,000 R. P. M. The rotor carries a number of horizontal bars or tubes 43 mounted with their axes parallel to the axis of the shaft 42. The coarse particles are introduced by means of the cylinder 44, which has a bent outlet 45 extending into the open end of the rotor.

In operation, the particles are first caught inside the rotating bars and subjected to great impact which is sufficient to break up groups of particles and break off cutting edges without crushing the individual particles. The inside of the machine is subject to severe erosion by the hard tempered particles, and I find that the bars can be made to last much longer by welding semi-cylindrical wear plates 46 to the bars 43 as indicated at 47. I place these rolls plates at an angle of substantially 45° to the rotor as shown in Figure 2. It will be noted that the bars are comparatively short. This length can of course be increased as desired, although it should not be excessive in view of the fact that the rotor is supported only at one end and there is no shaft bearing for the ring 48 which connects the outer ends of the bars.

Figure 4:
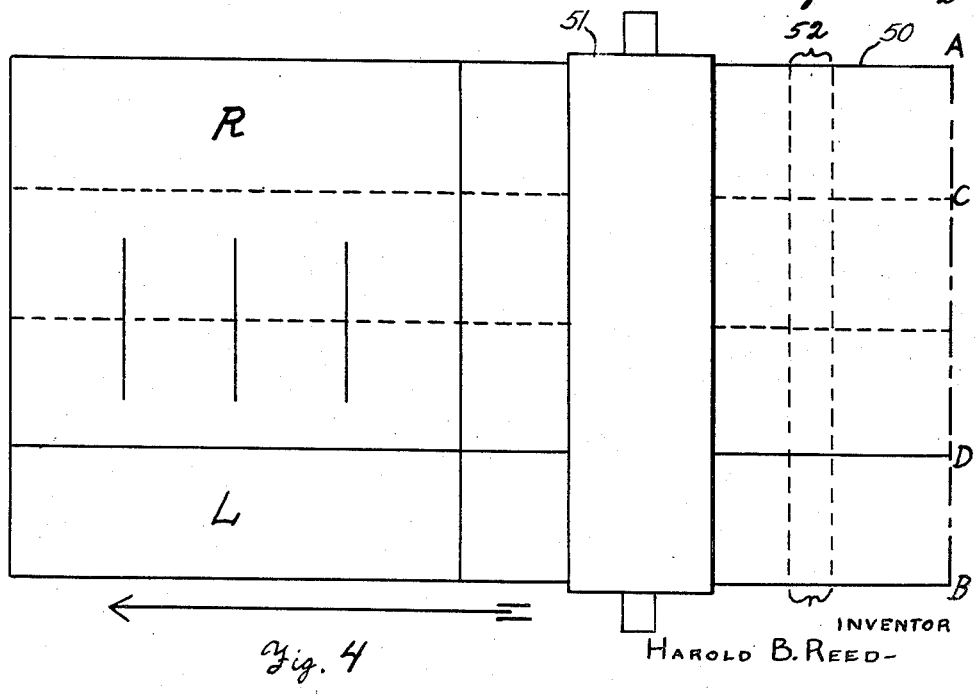
Figure 4 is a diagram showing the manner in which the shingles are coated and cut.

Figure 4 indicates the manner in which shingles are formed by application of the granules. A strip of roofing material having a felt base or the like is indicated at 50, and moves from right to left between rolls indicated at 51. Usually, the material comprises a single thickness, the full width shown in Figure 4 from A to B, and a second narrow thickness of the base material is attached to the main strip as indicated from C to D, this material being attached in the manner indicated and its upper surface coated with asphalt. The granules are sprinkled to the surface in an area indicated by 52, after which the granules are pressed into the surface of the asphalt by means of the rolls 51. This results in a shingle material having a width corresponding to twice the length of the shingle. After being rolled, the shingles are formed by cutting into strips as indicated by the solid line to the left of the figure, there being four shingles to a strip with the butt ends together.

By reason of the shape of the granules of my invention, rolling them into the surface has no directional effect, and they are incapable of being tilted over with the edge of one granule on top of the next. For this reason, it is unnecessary to separate the shingles marked "R" and "L," and they can be turned around and used side by side without any difference in their appearance.

I claim:

1. In a roofing material including a backing, a binder, and granular material carried by said binder, said granular material comprising cubical opaque granules having light reflecting surfaces and formed of slag from wet bottom powdered coal furnaces whereby heat and light deflection will be uniform in all directions.

2. In a roofing material including a backing, a binder, and granular material formed from molten ash of wet bottom powdered coal furnaces carried by said binder, said granular material comprising granules of generally cubical form whereby interlocking association between the granules and with the binder is obtained.

3. In a roofing material including a backing sheet, a binder, and cubical granules substantially uniform in area embedded in said binder, said granules being formed from fluid ash from wet bottom furnaces by subjecting the fluid ash while in a molten state at a temperature of not less than 2300° F. to a quenching.

HAROLD B. REED.

(References on following page)

REFERENCES CITED

The following references are of record in the file of this patent:

UNITED STATES PATENTS

| Number | Name | Date |
|---|---|---|
| 56,595 | Morris et al. | July 24, 1866 |
| 116,470 | Melvin | June 27, 1871 |
| 151,683 | Burnham | June 9, 1874 |
| 1,134,086 | Lowrey | Mar. 30, 1915 |
| 1,209,784 | Wagner | Dec. 26, 1916 |
| 1,228,769 | Grindle | June 5, 1917 |
| 1,387,219 | Weiss | Aug. 9, 1921 |
| 1,442,773 | Richmond et al. | Jan. 16, 1923 |
| 1,650,709 | Graveman | Nov. 29, 1927 |
| 2,112,819 | Williford | Mar. 29, 1938 |
| 2,139,619 | Howell | Dec. 6, 1938 |
| 2,211,570 | Kennedy et al. | Aug. 13, 1940 |
| 2,246,902 | Smith | June 24, 1941 |

FOREIGN PATENTS

| Number | Country | Date |
|---|---|---|
| 61,416 | Norway | Sept. 25, 1939 |

OTHER REFERENCES

Eckel, "Cements, Limes, and Plasters," 2nd ed., New York 1922, page 455.

Gibson & Selvig, Rare and Uncommon Chem. Elements in Coal, Washington 1944, page 2.